E. R. EVANS.
REAR AXLE CONSTRUCTION.
APPLICATION FILED FEB. 14, 1919.
1,410,663.
Patented Mar. 28, 1922.
2 SHEETS—SHEET 1.
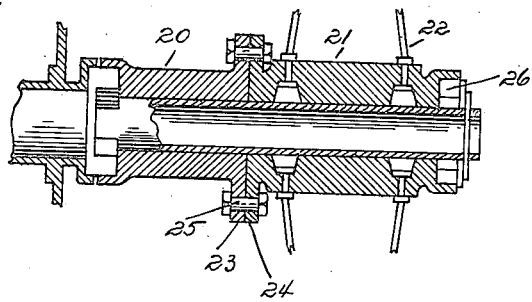
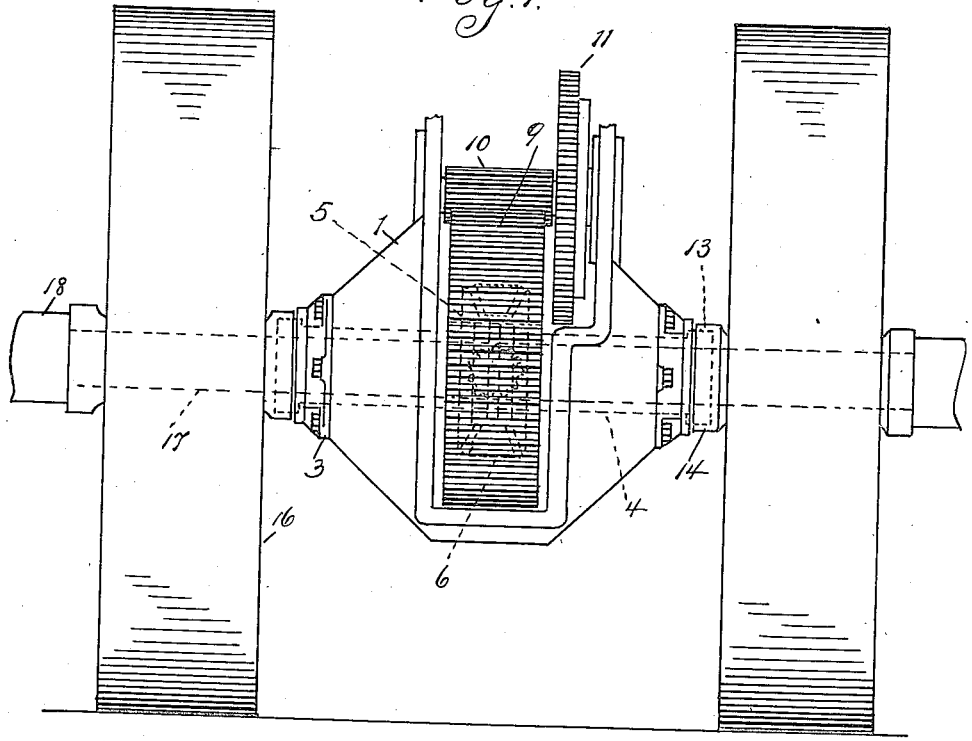
Inventor
Edwin R. Evans
By Whittemore Hulbert & Whittemore
Attorneys E. R. EVANS.
REAR AXLE CONSTRUCTION.
APPLICATION FILED FEB. 14, 1919.
1,410,663.
Patented Mar. 28, 1922.
2 SHEETS—SHEET 2.
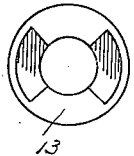
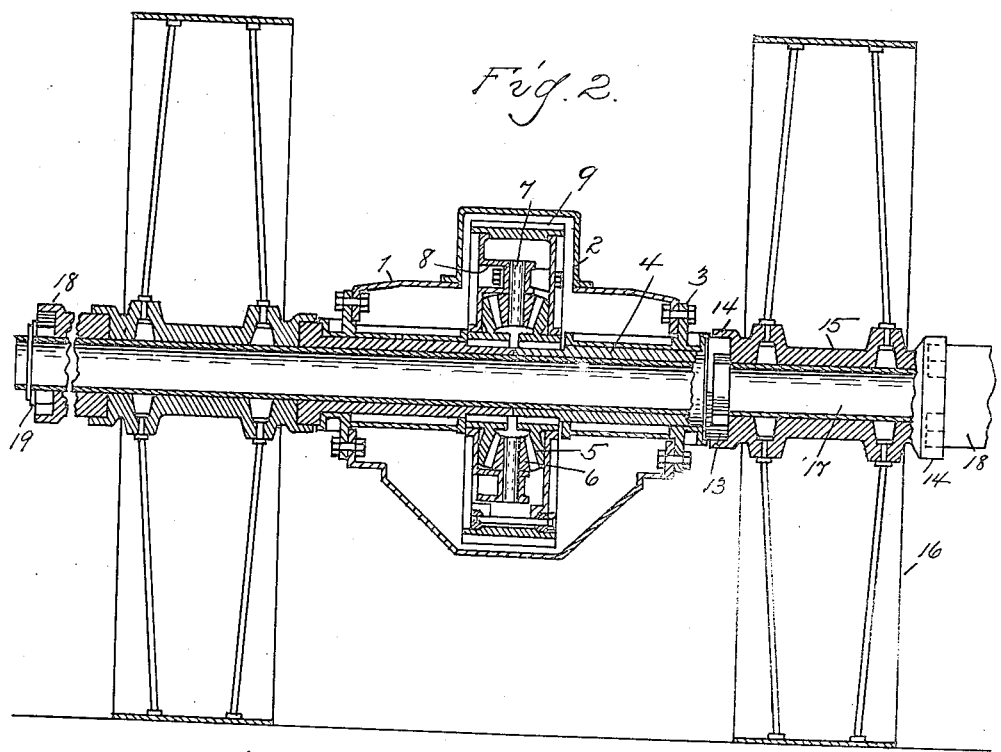
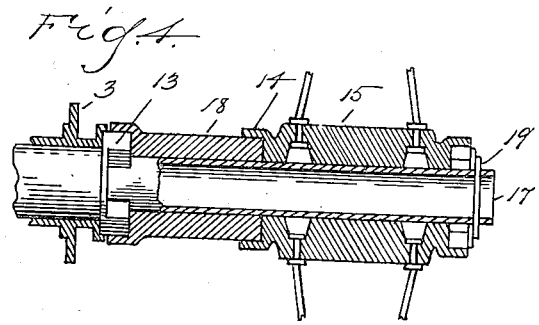
Inventor
Edwin R. Evans
By Whittemore, Hulbert & Whittemore
Attorneys

UNITED STATES PATENT OFFICE.

EDWIN R. EVANS, OF DETROIT, MICHIGAN.

REAR-AXLE CONSTRUCTION.

1,410,663.

Specification of Letters Patent. Patented Mar. 28, 1922.

Application filed February 14, 1919. Serial No. 276,934.

*To all whom it may concern:*

Be it known that I, EDWIN R. EVANS, a citizen of the United States of America, residing at Detroit, in the county of Wayne and State of Michigan, have invented certain new and useful Improvements in Rear-Axle Constructions, of which the following is a specification, reference being had therein to the accompanying drawings.

The invention relates to axle constructions of self-propelled vehicles and more particularly to rear axle constructions of tractors. One object of the invention is to provide a strong and durable construction in which the drive wheels are detachably mounted upon a shaft and are adjustable relative to this shaft to vary the width of the wheel base. Another object of the invention is to provide a simple strong driving mechanism for the drive wheels which will permit of their adjustment. Other objects of the invention reside in the novel arrangements and combinations of parts as more fully hereinafter set forth.

This application is a continuation in part of my former application, Serial No. 190,531, filed Sept. 10, 1917, upon rear axle construction, and formally allowed, March 15, 1918.

In the drawings:

Figure 1 is a top plan view of a construction embodying my invention, with the cover of the differential casing removed;

Figure 2 is a longitudinal sectional view thereof;

Figure 3 is an end view of a clutch jaw head;

Figure 4 is a longitudinal sectional view of a drive wheel and clutch spacer;

Figure 5 is a similar view of a modified construction.

1 is a differential casing having the detachable cover 2. 3 are long bearings secured to the ends of the differential casing and extending therein. Journaled in these long bearings are drive sleeves 4 having inner abutting ends upon which are mounted beveled gear wheels 5 which mesh with one or more pinions 6, journaled on studs 7 carried by the hub portion 8 of a large gear wheel 9. This large gear wheel 9 is housed within the differential casing 1 and the cover 2 and its hub portion 8 is rotatably mounted on the hub portions of the beveled gear wheels 5. 10 is a pinion meshing with the large gear wheel 9, this pinion being driven by a gear wheel 11, which is adapted to be operated from the power plant of the vehicle.

The outer ends of the drive sleeves 4 are provided with the clutch jaw heads 13 which are detachably interlocked with the clutch jaw heads 14 upon the hubs 15 of the drive wheels 16. These drive wheels are rotatably mounted upon the ends of the tubular shaft 17 which extends through the drive sleeves 4. The drive wheels 16 are of conventional form with the exception that the hubs 15 have both ends provided with a clutch jaw head 14 so that either side of the wheel may be connected to a drive sleeve.

For the purpose of varying the width of the wheel base of the vehicle the clutch jaw spacers 18 are provided, these spacers being in the form of sleeves having jaws at the opposite ends thereof. These spacers are adapted to be sleeved upon the drive shaft 17 and to secure the greatest width of the wheel base are adapted to be positioned between a clutch jaw head 14 of each of the drive wheels 16 and a clutch jaw head 13 of each of the drive sleeves 4, this arrangement being shown in Figure 4. When it is desired to have a smaller width of wheel base, the clutch jaw spacers may be mounted on the shaft 17 outside the drive wheels 16, in which case the clutch jaw heads 14 of the wheels directly engage and interlock with the clutch jaw heads 13 upon the drive sleeves. For retaining the drive wheels upon the shafts 17 suitable fastening means 19, such as cotter pins, are provided engaging the ends of the shaft 17.

As shown in Figure 5, the clutch jaw spacer 20 is secured to one end of the hub 21 of the drive wheel 22. In the present instance, the spacer has the flange 23 which abuts against the flange 24 upon the hub 21 and these flanges are secured to each other by means of the bolts 25 passing therethrough. With this arrangement it will be readily seen that each of the drive wheels 22 may be driven from the drive shafts through their spacers 20, in which case the width of the wheel base is greatest. The drive wheels may be reversed upon the tubular shaft and have their clutch jaw heads 26 directly engage the clutch jaw heads of the drive shafts, in which case the width of the wheel base is decreased.

From the above description it will be readily seen that I have provided an extremely light, rigid and durable rear axle construction and it is apparent that it is possible to provide roller bearings or other types of anti-frictional bearings between the hubs of the drive wheels and the tubular shaft so that the axle will be practically a full-floating axle. Because of the design of the differential casing 1, which tapers from the central portion thereof to its ends, it is practically impossible for the tubular shaft 17 to bend or twist and by virtue of the long drive sleeves 4 and the manner in which said sleeves are connected with the hubs 15 of the drive wheels, there is a positive driving connection between the differential and the drive wheels and furthermore all parts are well protected.

What I claim as my invention is:

1. In an axle construction, the combination with a shaft, of drive wheels rotatably mounted directly on the ends thereof, means for varying the distance between said drive wheels, driving sleeves surrounding said shaft and having a detachable driving connection with said drive wheels, and means for driving said sleeves.

2. In an axle construction, the combination with a casing and bearings secured to the ends of said casing and extending inwardly adjacent to each other, of drive sleeves journaled in said bearings, a shaft extending through said drive sleeves, wheels rotatably mounted directly on said shaft and non-rotatably connected to said drive sleeves, and means within said casing for driving said sleeves.

3. In a rear axle construction, the combination of a differential casing having its opposite end portions tapering from its central portion, long end bearings extending inwardly from near the opposite ends of said casing, drive sleeves in said bearings and having the outer ends thereof provided with clutch jaw heads, differential mechanism at the adjacent ends of said drive sleeves, a tubular shaft extending through said drive sleeves, wheels rotatable directly on the ends of said shaft, and a jaw clutch head carried by the hub of each wheel and interlocked with the clutch jaw head of each of said drive sleeves.

4. In a rear axle construction, a differential casing, end bearings carried thereby, drive sleeves journaled in said end bearings and provided with clutch heads, a tubular shaft extending through said drive sleeves, wheels rotatable directly on the ends of said shaft and having hubs articulated with the clutch heads of said drive sleeves, and means in said differential casing for imparting movement to said drive sleeves.

5. In a rear axle construction, a differential casing, drive sleeves in caid casing provided with clutch heads, a shaft extending through said sleeves, wheels on said shaft having hubs with the ends thereof shaped and adapted for engagement with the ends of said drive sleeves, and spacers on said shaft and adapted for establishing a driving relation between said wheels and said sleeves.

6. In a rear axle construction, a differential casing, drive sleeves in said casing provided with clutch heads, a shaft extending through said sleeves, wheels on said shaft having hubs with the ends thereof shaped and adapted for engagement with the ends of said drive sleeves, and spacers adapted for mounting either on the ends of said shaft or between said wheel hubs and the outer ends of said sleeves, the latter position articulating said wheel hubs and sleeves for driving purposes and increasing the wheel base width.

7. In an axle construction, the combination with a shaft, of ground wheels rotatably mounted thereon, and means for adjusting said ground wheels to vary the distance therebetween, comprising driving sleeves concentric with said shaft and having a detachable driving connection with said ground wheels in one of their adjusted positions.

8. In an axle construction, the combination with a shaft, of ground wheels rotatably mounted thereon, driving means, and common means for varying the distance between said ground wheels and for driving the same from said driving means.

In testimony whereof I affix my signature.

EDWIN R. EVANS.